(12) United States Patent
Ling (10) Patent No.: US 7,378,758 B2
(45) Date of Patent: May 27, 2008

(54) PARALLEL INVERTER SYSTEM (75) Inventor: Sandy Ling, Shenzhen (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 437 days.

(21) Appl. No.: 10/501,355

(22) PCT Filed: Dec. 12, 2002

(86) PCT No.: PCT/CN02/00886

§ 371 (c)(1),
(2), (4) Date: Jan. 4, 2005

(87) PCT Pub. No.: WO03/058803

PCT Pub. Date: Jul. 17, 2003

(65) Prior Publication Data
US 2005/0117373 A1 Jun. 2, 2005

(30) Foreign Application Priority Data
Dec. 25, 2001 (CN) ............... 01 1 30146

(51) Int. Cl.
*H02J 3/38* (2006.01)
(52) U.S. Cl. ........................... 307/82; 363/71
(58) Field of Classification Search ............ 307/82, 307/83; 363/71
See application file for complete search history.

(56) References Cited

U.S. PATENT DOCUMENTS

| | | | |
|---|---|---|---|
| 3,675,037 A * | 7/1972 | Hamilton | 307/51 |
| 4,947,310 A * | 8/1990 | Kawabata et al. | 363/71 |
| 5,191,519 A | 3/1993 | Kawakami | |
| 5,212,630 A * | 5/1993 | Yamamoto et al. | 363/71 |
| 5,852,554 A | 12/1998 | Yamamoto | |
| 5,956,244 A | 9/1999 | Rehm et al. | |
| 6,178,103 B1 | 1/2001 | Deng et al. | |
| 6,452,290 B1 * | 9/2002 | Yoshioka et al. | 307/82 |

* cited by examiner

*Primary Examiner*—Michael J Sherry
*Assistant Examiner*—Andrew M. Deschere
(74) *Attorney, Agent, or Firm*—Brinks Hofer Gilson & Lione (57) ABSTRACT

The invention relates to a parallel inverter system, in which each inverter includes a synchronized square wave generator, a voltage given generator, a voltage regulating unit and a power amplifier unit. All of the above components are connected in parallel. The output current given by the voltage regulating unit no longer requires selection of "one out of many components," but outputs a linear combination result of outputs of all of the voltage regulating units after linear combination, thereby changing an unequal parallel connection to an equalized parallel connection. At the same time, the output square waves of all of synchronizing square wave generators are inputted into voltage given generators as the synchronizing square wave after AND. The output sine waves of all of voltage given generators after linear combination are used as given voltage of voltage regulating units.

9 Claims, 10 Drawing Sheets

FIG. 7 circuit in the module 1 circuit in the module 2

FIG. 8 circuit in the module 1 circuit in the module 2

PARALLEL INVERTER SYSTEM

TECHNICAL FIELD

The present invention relates to a power supply system, more particularly to a high power inverter system by connecting several lower power inverters in parallel.

BACKGROUND ART

A plurality of lower power inverters can be connected in parallel to form a higher power inverter. In order to connect a plurality of inverters to form a parallel inverter, the main problem to be solved is how to reduce the circulating current among the modules. It is necessary not only to achieve the increasing by integer multiples of the load-carrying capacity, but also to achieve the even distribution of the load, so that all of the inverters have the same MTBF (Mean Time Between Failures) in theory, thereby achieving the maximum of the parallel system MTBF. In order to achieve such an object, there are following solutions in the art.

Figure 1:
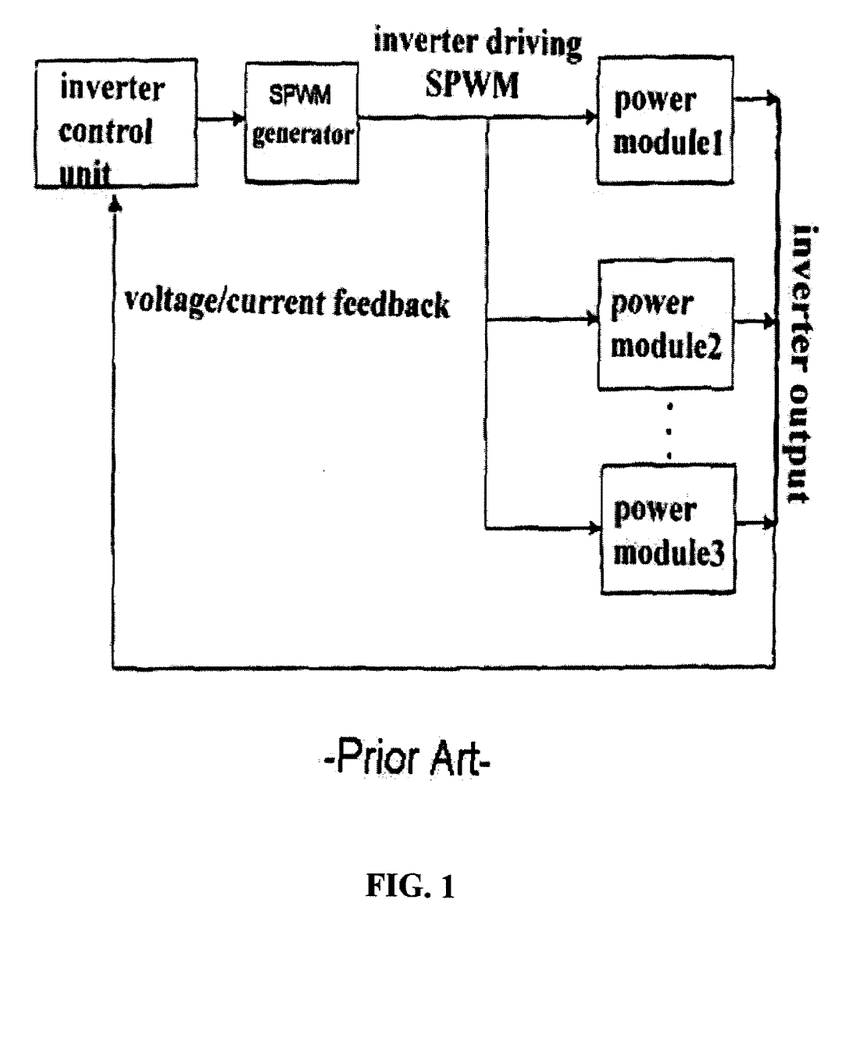
FIG. 1 is a control block diagram of the centralized control in the prior art.

In the first solution, it adopts a method of master-slave control in order to connect a plurality of inverters in parallel, that is, a control unit is used to control all of the power modules. All the power modules utilize the same driving signal of SPWM (sine pulse width modulation) to obtain substantially the same output, and its control block diagram is shown in FIG. 1. This control solution resolves the synchronization of the output voltages effectively, and adding the means of regulating bus voltage can achieve higher preciseness of even current. However, the disadvantage is the centralized form of control unit. A fault occurring in the control unit may cause the whole system paralyzed. Therefore, after the system is connected in parallel, the improvement of its MTBF is rather little because the fault bottleneck is presented.

To overcome the disadvantage of the first solution, the second solution is provided. In this solution, every inverter is provided with a control unit, but only one control unit is turned on at any time by way of intellective selection. If any fault occurs in the control unit, the system will jump to some other control unit automatically. Although the second solution resolves the problem of the fault bottleneck, the complexity and the cost of such a system are increased. Also, the switching of the driving wave is technically dangerous, which is likely to lead the damage of the power tube. Moreover, switching the control unit renders the jump of the amplitude or phase of the output voltage to some extent, and reduces the purity of the output voltage. Meanwhile, it may realize the parallel connection of only few power modules since the load-carrying capacity of the control circuit is limited. Another disadvantage of this solution is that a logic control unit must be added because of the necessity of controlling the switches concentratedly, and thus it not only increases the additional cost but also adds the new fault bottleneck.

Figure 2:
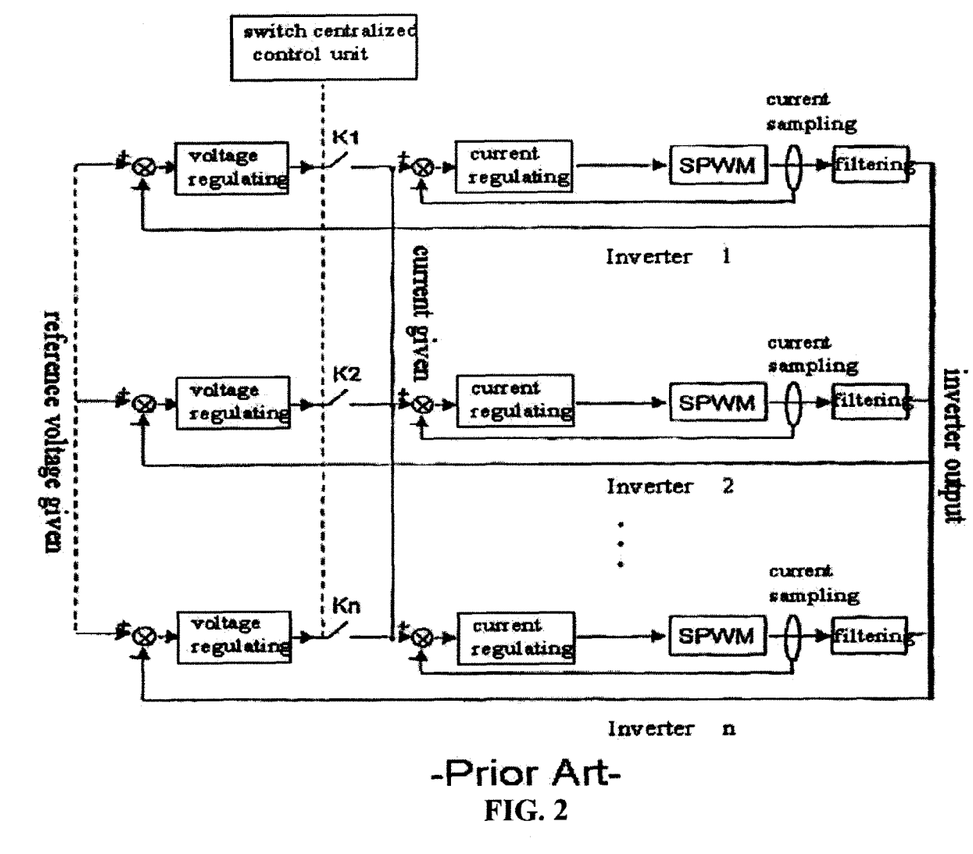
FIG. 2 is a block diagram of the improved parallel inverter of concentrated control in the art.

The third solution is provided to reduce the fault rate of the master control unit and to prevent the danger brought by switching of the driving wave. In this solution, the parallel point is moved forward. The control block diagram of the improved parallel inverter is shown in FIG. 2, that is, the parallel point is moved forward to the output point of the voltage regulation. At any moment, only one of the selected switches K1~Kn can turn on, that is, only one voltage regulating loop is selected to work, and other voltage loops are in a state of thermal backup.

In comparison with the second solution, the third solution can overcome not only the problem of fault bottleneck of the control unit, but also resolve the danger of the switching of the driving wave. And since the commonly shared units are fewer, the reliability is enhanced. However, the complexity of the system switching still exists. Switching may also render the jump of the amplitude and the phase of the output voltage to some extent, and the load-carrying capacity of the control circuit cannot be improved. Further, only few power modules can be connected in parallel. This is essentially still a kind of centralized control. This solution cannot overcome the problem of switching of centralized control switches as well, and should add a logic control unit. This increases the cost and the new fault bottleneck. Moreover, the user is likely to pull out the inverter being used as the master module due to the requirement of the hot plug, such that the problem caused by the master-slave switching is more serious.

SUMMARY OF THE INVENTION

With respect to the above defects in the prior art, the object of the present invention is to improve the circuit of the parallel inverter to provide a parallel inverter system with superior performance.

The object of the invention can be realized by the following technical solution that is to construct an inverter system including several inverters capable of being connected in paralleled.

Each of the several inverter comprises: a synchronous unit for generating synchronous signals to ensure the synchronization of voltage given signals in the respective inverters being connectable in parallel, a voltage given generator for generating a sine voltage with a given frequency, phase and amplitude, a voltage regulating unit for regulating the inverter output voltage, and a power amplifier unit for converting directly a direct current power supply into an alternating current power supply.

It is characterized in that each voltage regulating unit of each inverter includes a voltage regulator circuit and a voltage linear combination circuit, and the voltage linear combination circuit combines all of the output voltages of the voltage regulator linearly, and then outputs them to the power amplifier unit.

In the parallel inverter system of the present invention, the synchronous unit is a synchronizing square wave generator. In the synchronizing square wave generator, the precise high frequency oscillating signals are generated by an oscillator, output to a divider to be made to a square wave with the power frequency, and then output though OC gate and fault shield switch K2. The OC gate has the outputs of respective dividers AND and output them to the voltage given generator as synchronizing square waves.

A voltage virtual value given circuit inputs a required voltage virtual value in the voltage given generator of the parallel inverter system of the present invention. The voltage virtual value is outputted to a sine wave generator through a virtual value regulating circuit; and a phase discriminator receives the synchronizing square wave outputted by the synchronizing square wave generator, and constitutes a phase-locked loop with the sine wave generator. The output terminal of the sine wave generator connects the voltage regulating unit through the impedance circuit and the fault shield switch K3, and the output impedance circuit can combine linearly the outputs of the various sine wave generators to serve as given voltage of the voltage regulating unit.

In the parallel inverter system of the present invention, the power amplifier unit includes a SPWM generator, a driving circuit, power switching elements and a filter connected in turn. The waves of high frequency SPWM generated by the SPWM generator are used to drive the power switching elements after they are amplified by the driving circuit. The power switching elements are turned on and off alternately to convert the direct current into amplified SPWM waves, and the filter removes the carrier wave of the amplified SPWM wave to obtain the amplified sine power supply.

In the parallel inverter system of the present invention, the voltage regulator can be P regulation, PI regulation or PID regulation; and the voltage linear combination circuit comprises an output impedance and fault shield switch (K4).

The voltage regulating unit of the present invention can also include a saturation suppression circuit. The saturation suppression circuit detects the difference between the output voltage of the voltage regulator and the output linear combination value of the parallel inverter system, and feedbacks it to the voltage regulator.

The current regulator unit can be connected between the voltage unit regulating and the power amplifier unit of the present invention for regulating the distortion of the inverter output voltage and realizing the even distribution of the load of respective inverters.

In the present invention, the following relation exists between the output voltage of respective voltage regulator V_PI(j) and the output voltage of the voltage linear combination circuit after linear combination V_PI_out:

$$V\_PI\_out = \sum_{j=1}^{N} K(j) \cdot V\_PI(j),$$

wherein, K(j) is weight number, $$\sum_{j=1}^{N} K(j) = 1.$$

While the following relation may exist between the output voltage of respective voltage regulator V_PI(j) and the output voltage of the voltage linear combination circuit after being averaged V_PI_out:

$$V\_PI\_out = \sum_{j=1}^{N} V\_PI(j) \div N,$$

wherein N is the number of the parallel inverters.

In the parallel inverter system of the present invention, the voltage linear combination circuit averages the output voltages of all the voltage regulators, and then outputs them to the power amplifier unit.

It can be derived from the above-mentioned solution that the parallel inverter system of the present invention can realize theoretically parallel connection of any number of inverters; there is not any centralized logic control unit, and thus no bottleneck problem. There is not a commonly shared part, and all parallel modules have completely the same function, and are connected in parallel equally. There is not a selecting switch, and not any control switch problem during the fault.

The present invention will be further described in conjunction with the accompanying drawings and embodiments.

DETAIL DESCRIPTION OF PREFERRED EMBODIMENTS

Figure 3:
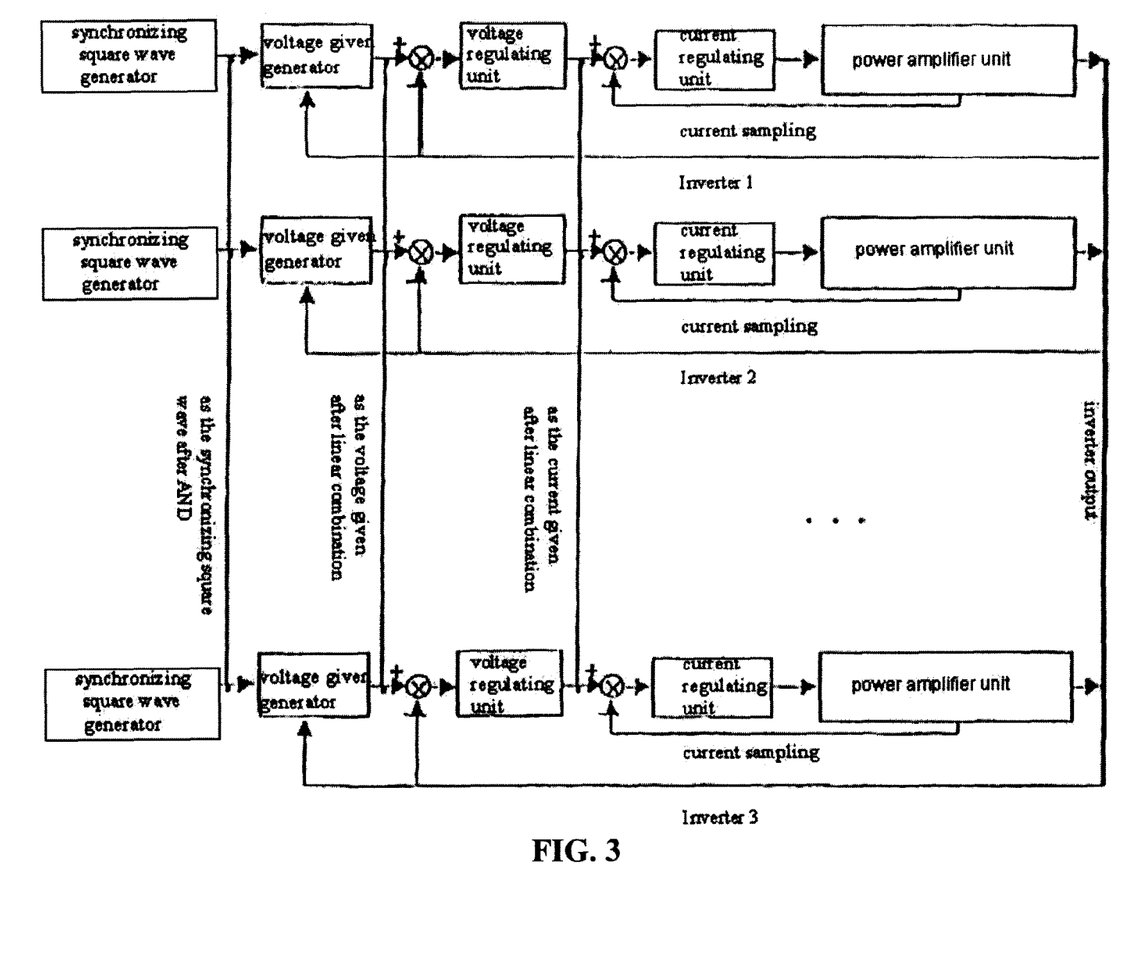
FIG. 3 is a schematic block diagram of the parallel inverter system in the present invention.

FIG. 3 shows a schematic block diagram of the parallel inverter system of the present invention. It can be seen from FIG. 3 that there are n inverters connected in parallel in the parallel inverter system, and each inverter includes a synchronizing square wave generator, a voltage given generator, a voltage regulating unit, a current regulating unit and a power amplifier unit. Moreover, a voltage feedback circuit is also set for feeding back the voltage sampled at the inverter output terminal to the voltage given generator and the voltage regulating unit, and a current feedback circuit for feeding back the current sampled at the output terminal of the power amplifier unit to the circuit regulating unit.

In comparison with the above-mentioned third solution in the prior art, the main improvement of the present invention is that the current given is no longer selection of one out of many any more; but the output of voltage regulators of all of the voltage regulating units are used as the current given after linear combination, thereby changing the previous un-equalized parallel to equalized parallel. Meanwhile, the output square waves of all synchronizing square wave generators are used as synchronized square wave output of the voltage given generators after being AND, and the output sine waves of all the voltage given generators are voltage given of the voltage regulating units after being linear combination.

The functions of respective parts are illustrated hereinafter.

1. Synchronizing Square Generator

Figure 4:
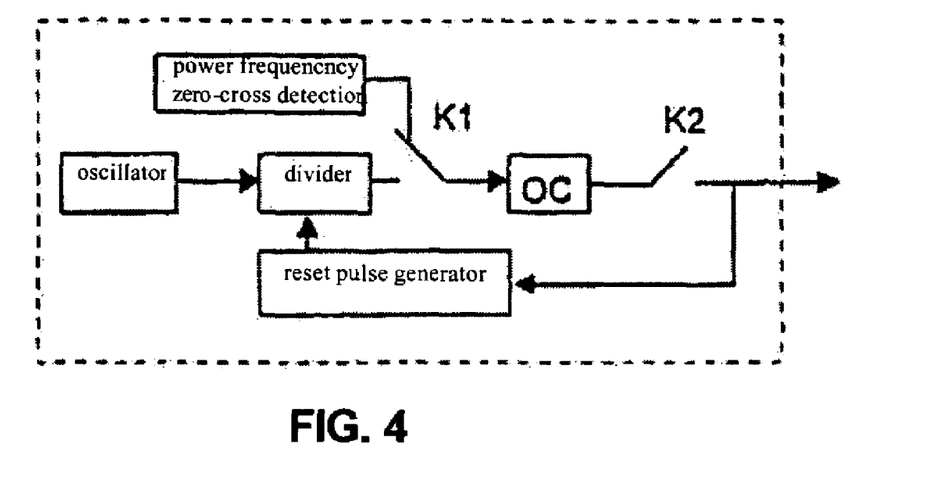
FIG. 4 is a schematic block diagram of the synchronizing square wave generator in the present invention.

As shown in FIG. 3, the synchronizing unit uses the synchronizing square wave generator, of which the schematic diagram is shown in FIG. 4, wherein the oscillator comprises RC, LC, crystal oscillator or crystal, which is used to generate precise high frequency oscillating signals. A divider processes the high frequency oscillating signals to be the power frequency square wave; K1 chases selectively the city power supply, and detects the zero-cross of the city power supply. K1 may also chase selectively the local oscillator, and the divider is connected to the OC gate though K1, and then connected to the voltage given generator though K2. When K2 is closed, the synchronizing square wave generator participates in the output; while a fault occurs at the front-end of the K2, and K2 is opened, the synchronizing square wave generator does not participates in the output, whereby the fault can be shielded. Since the synchronizing square wave generator of each inverter is outputted after AND through OC gate, the open of K2 will not affect the work of the parallel system. The reset pulse generator is used as a reset divider to enable the local oscillator always follow the output synchronizing square wave such that the close of K2 does not affect the frequency and phrase of the synchronizing square wave of the system.

In the present invention, the synchronizing unit can also realize the synchronization of the voltage given signals by following the city power supply or communicating between the microprocessors and the like. This is not limited to the synchronizing square wave generator shown in FIG. 3.

2. Voltage Given Generator

Figure 5:
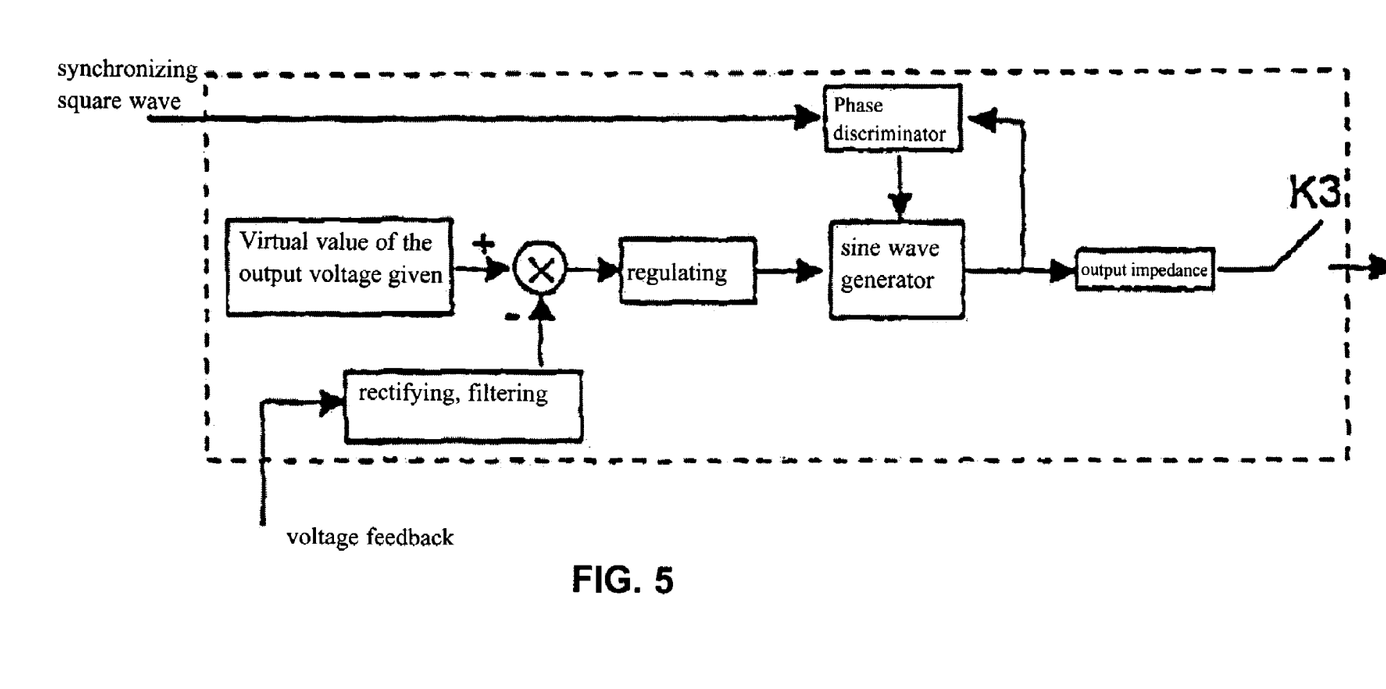
FIG. 5 is a schematic block diagram of the given voltage generator in the present invention.

The principle of the voltage given generator is shown in FIG. 5, which generates primarily the pure sine waves of the given frequency, phrase and amplitude, and regulates the virtual value of the output voltage.

The virtual value of the voltage is to map the virtual value of the output voltage. After powering up, the virtual value of the voltage should rise slowly from zero to the given value, to realize the soft start of the inverter. The regulating unit is used to regulate the virtual value of the output voltage to make it follow the given virtual value of the voltage. When the inverter causes the virtual value of the output voltage to change for some reason, the regulating loop can compensate for it. The regulator in the regulating unit can be a switching regulation, P regulation, PI regulation or PID regulation. The phase discriminator and the sine wave generator constitute a phase locked loop to synchronize the sine wave outputted from the sine generator with the synchronizing square wave. The amplitude of the sine wave generated by the sine wave generator relates to the regulation of the virtual value, and the frequency and phase relate to the synchronizing square wave. The output impedance is used to calculate the average of the respective parallel units. When K3 is closed, the voltage given generator participate in the output; and when a fault occurs at the front-end of K3, K3 is closed to shield the fault, and the voltage given generator does not participate in the output. Since the outputs of the respective sine wave generators are given voltage of the voltage regulating unit after linear combination through the output impedance circuit, the system can still work normally when K3 is opened.

Figure 11:
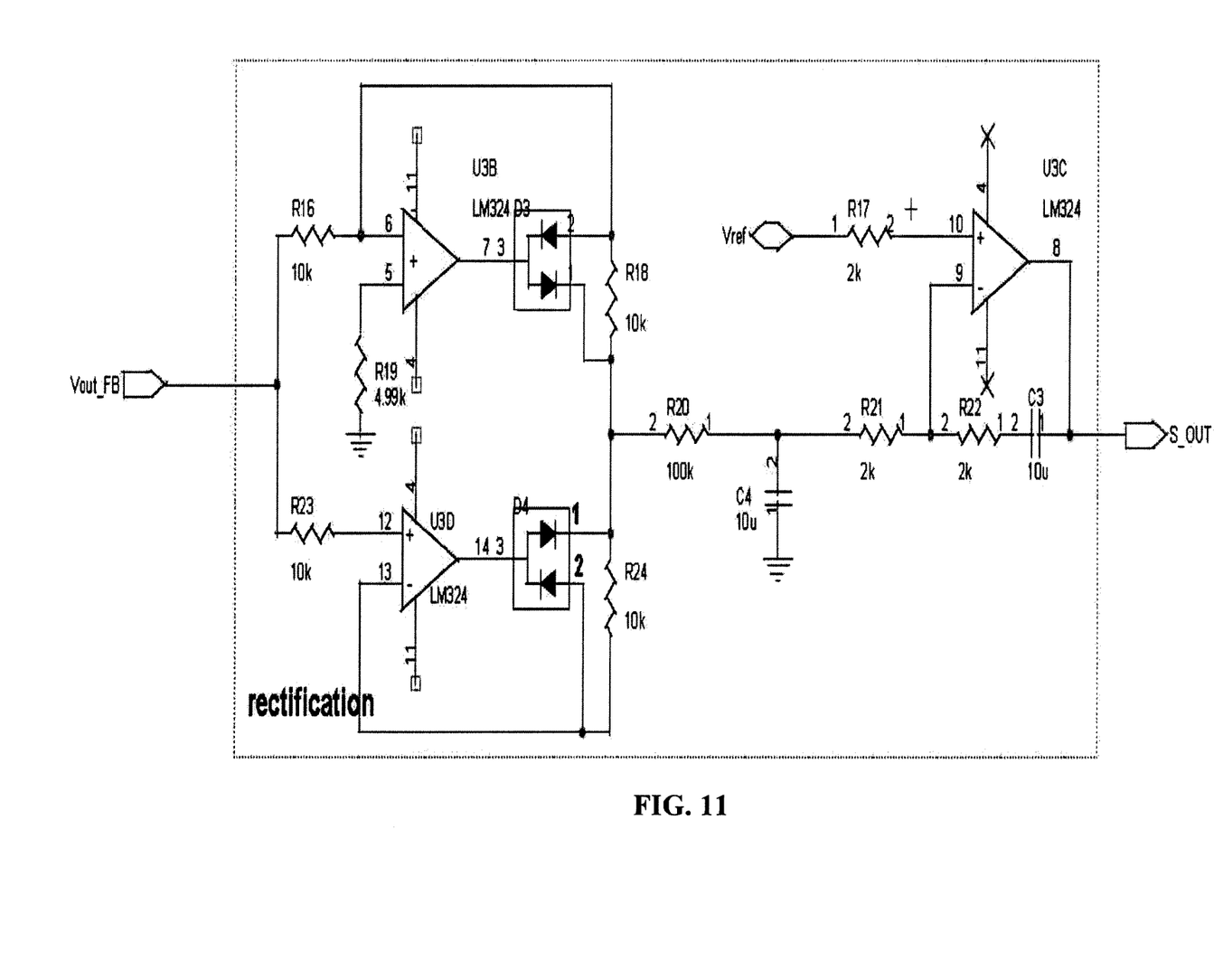
FIG. 11 is a circuit diagram of the virtual value regulation of the embodiment of the present invention.

In the present invention, the preferred embodiment of the circuit for the regulation of the virtual value is shown in FIG. 11. The regulation of the virtual value compensates primarily for the output voltage drop due to the load, thereby stabilizing the virtual value of the output voltage of the system within the designed range. PI regulation is used here, but it is not limited to PI regulation.

3. Voltage Regulating Unit

Figure 6:
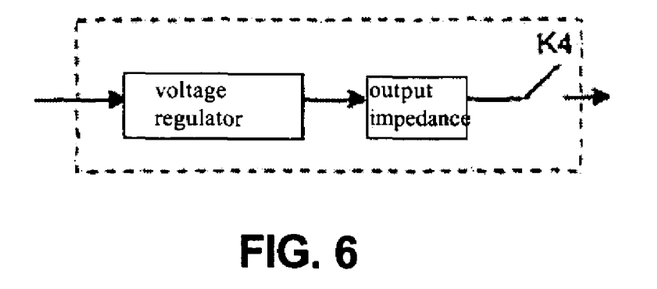
FIG. 6 is a schematic block diagram of the voltage regulating unit in the present invention.

The voltage regulating unit is mainly used to regulate the distortion of the output voltage of the inverter. As shown in FIG. 6, the forms of voltage regulator circuit are various, and the specific form is determined according to the requirement of the system. When K4 is closed, the voltage regulating unit participates in the output; the output impedance is used to calculate the linear combination of the output voltages of voltage regulator of each parallel unit. After the linear combination is calculated, the bias error caused by the disagreement of the outputs of the voltage regulators can be eliminated. If the fault occurs at the front-end of K4, opening K4 can shield the fault. Since the output of each voltage regulator circuit is linearly combined through the output impedance, the system can still work normally.

Figure 7:
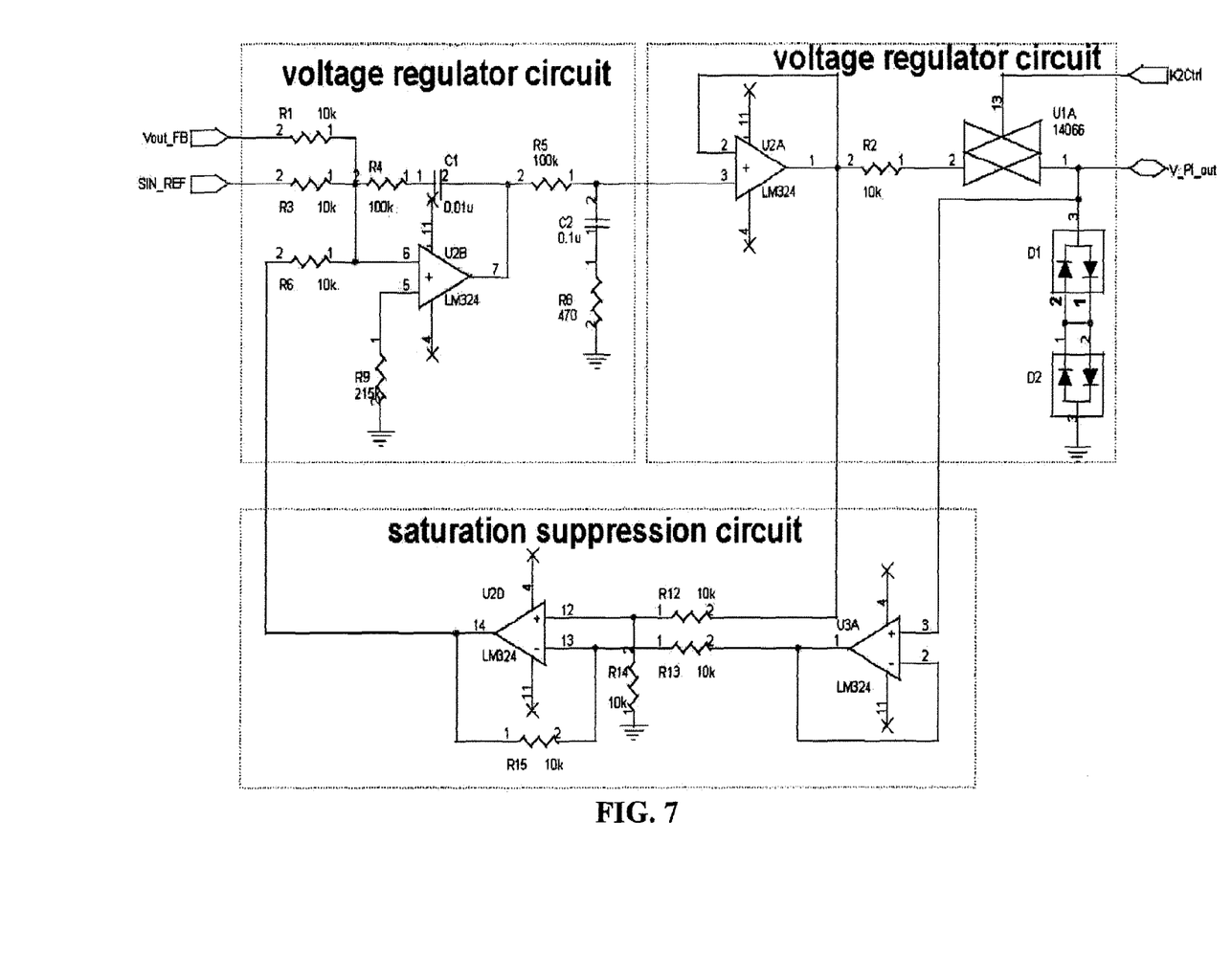
FIG. 7 is a circuit diagram of the voltage regulator and the voltage linear combination circuit of the embodiment of the present invention.

The preferred embodiment circuit of the voltage regulating unit is shown in FIG. 7, wherein the voltage regulator is PI regulator, but it can be P regulation, PID regulation and the like in the practical application. The output resistance R2 is mainly used to obtain the value of the parallel linear combination, and it can be all kinds of forms, such as capacitive impedance, or inductive impedance. Whatever the form is, the main object is that the result obtained on the parallel signal line is the linear combination value of the outputs from the respective voltage regulators when two or more inverters are connected in parallel.

In the voltage regulator units of all the inverters, the voltage linear combination circuit combines linearly the output voltages of all of the voltage regulator circuits and then outputs it. It is assumed that the output voltage of template j is V_PI(j), wherein j=1, 2, . . . , N, and the coefficient is K(j), and then the output voltage obtained after the linear combination is $$V\_PI\_out = \sum_{j=1}^{N} K(j) \cdot V\_PI(j),$$

the coefficient K(j) can be calculated according to the practical parameters of the circuit.

Figure 8:
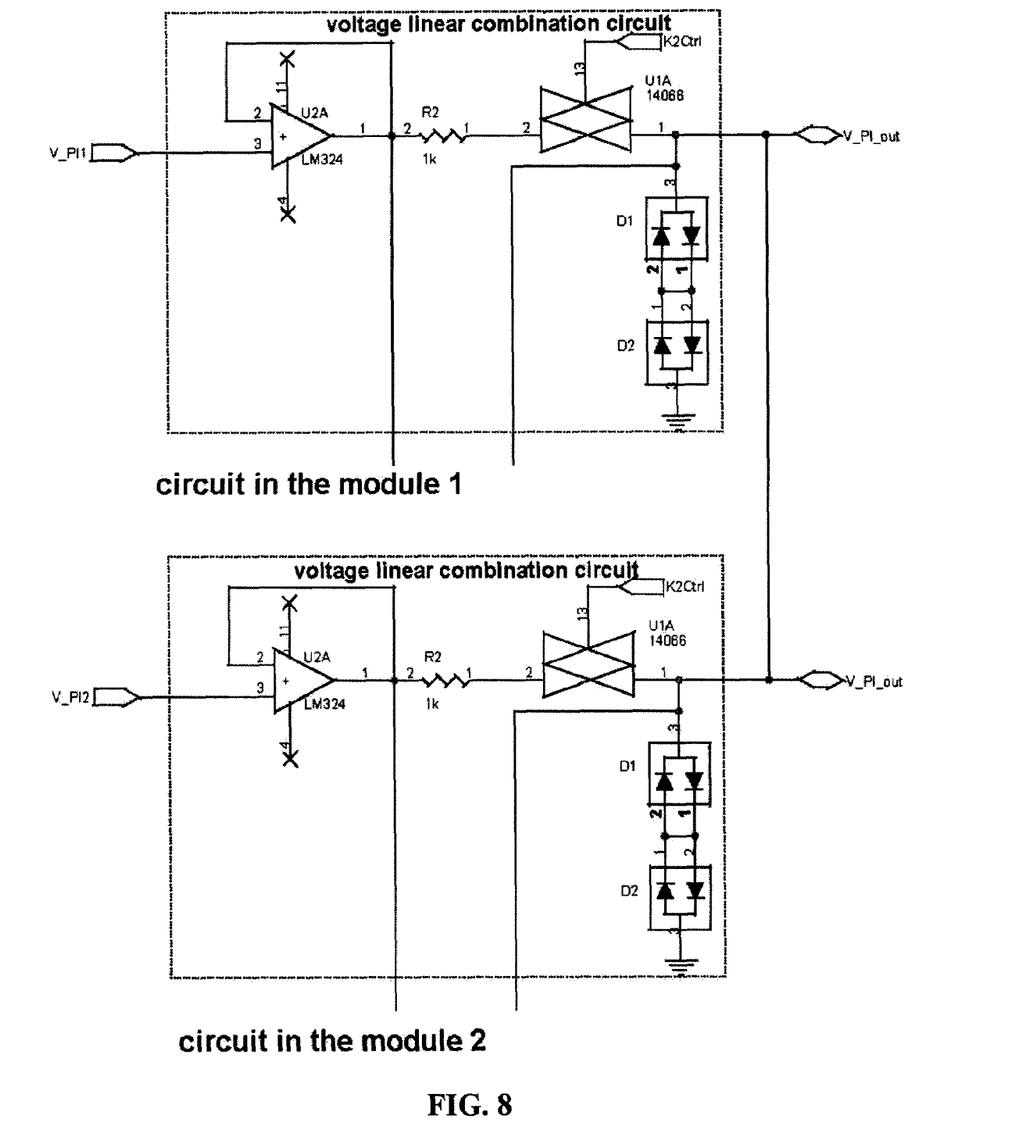
FIG. 8 is a diagrammatic view of an embodiment of the present invention when the output impedances of the two voltage linear combination circuits are equal.
Figure 9:
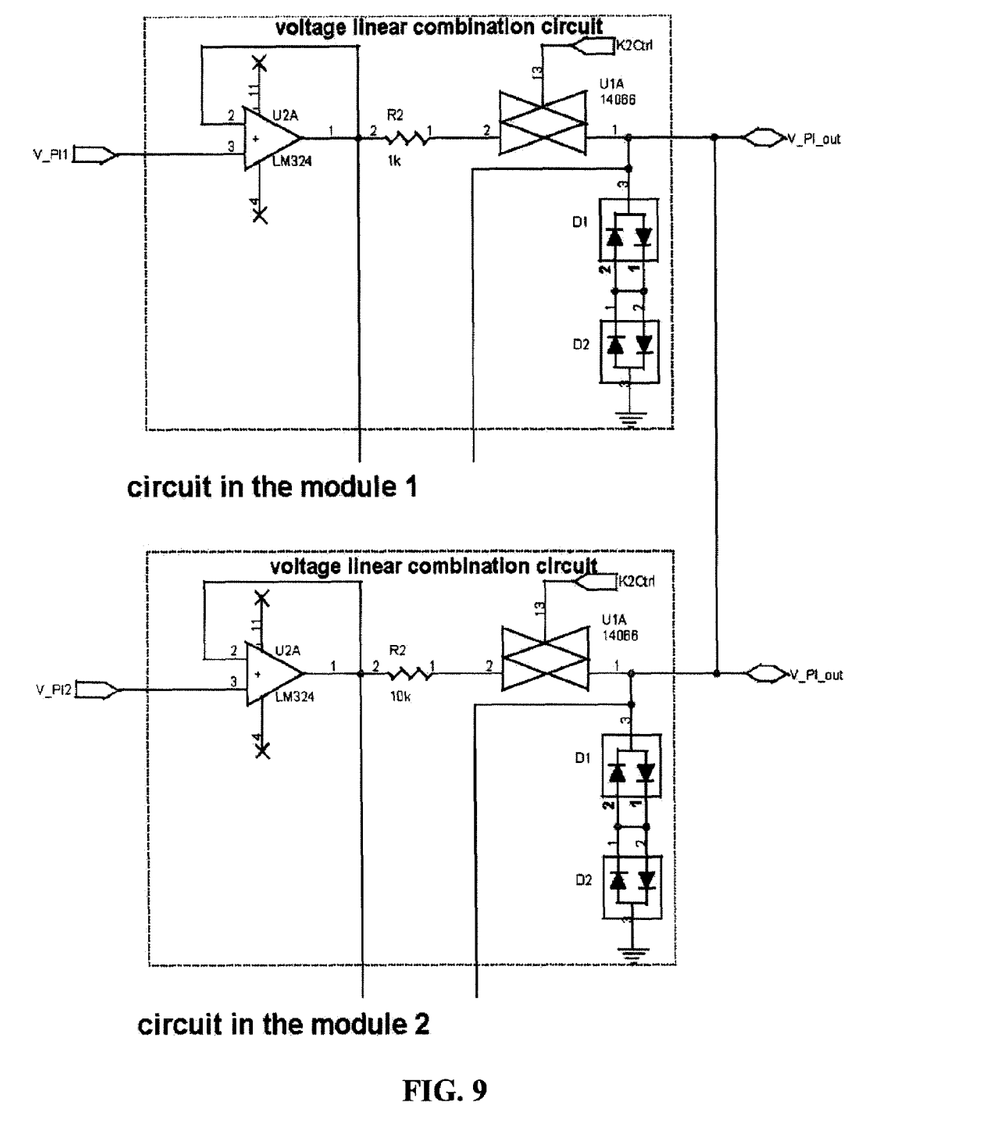
FIG. 9 is a diagrammatic view of another embodiment of the present invention when the output impedances of the two voltage linear combination circuits are unequal.

In the two embodiments shown in FIG. 8 and FIG. 9, the following relationship exists:

$$\sum_{j=1}^{N} \frac{V\_PI(j) - V\_PI\_out}{Rj} = 0$$

After conversion, obtained here is that $$K(j) = \frac{1}{Rj \sum_{j=1}^{N} \frac{1}{Rj}}.$$

In FIG. 8, since the output resistances of the two voltage linear combination circuits are both 1000Ω, it can be calculated from the circuit that:

$$V\_PI\_out = 0.5 \cdot V\_PI1 + 0.5 \cdot V\_PI2$$

It is a common average mode, which corresponds to dividing the result of the addition of the both by two.

In FIG. 9, since the output resistance is 1000Ω in the upper voltage linear combination circuit, and the output resistance is 10000Ω in the lower voltage linear combination circuit, it is can be calculated that:

$$V\_PI\_out = \frac{10}{11} \cdot V\_PI1 + \frac{1}{11} \cdot V\_PI2$$

The coefficient K(j) being 1/N is a preferred embodiment of the present invention. This is because the materials of the respective parallel modules are completely the same, and it will be beneficial to the production and to detection of the fault of the voltage regulator, and eliminate more efficiently the differences among various modules.

In the voltage regulating unit shown in FIG. 7, PI voltage regulator and the linear combination circuit have a disadvantage that when the two (or more) inverters are connected in parallel, the slight difference of feedback can cause the two PI voltage regulator circuits to saturate oppositely, that is, one is positive saturation and the other negative saturation, such that the regulating ability of the PI voltage regulator is weaken, and the output waves become poor. To solve this problem, the saturation suppression circuit is added in FIG. 7. The difference between the output of the PI voltage regulator and the linear combination value of the output of the PI voltage regulators of all of the modules detected by the saturation suppression circuit is fed back to the PI regulator, so that the difference between the PI voltage regulator and the linear combination value is restrained. Therefore, the disadvantage of the abnormal saturation of the PI voltage regulator is restrained.

4. Current Regulating Unit

The usage of the current regulating unit is to improve the even load performance of the respective inverters. In practical application, it can be decided whether or not the unit is used according to the requirements of the system. The current loop can be P regulation, PI regulation, PID regulation or the current, as decided according to the requirements of the system.

Figure 10:
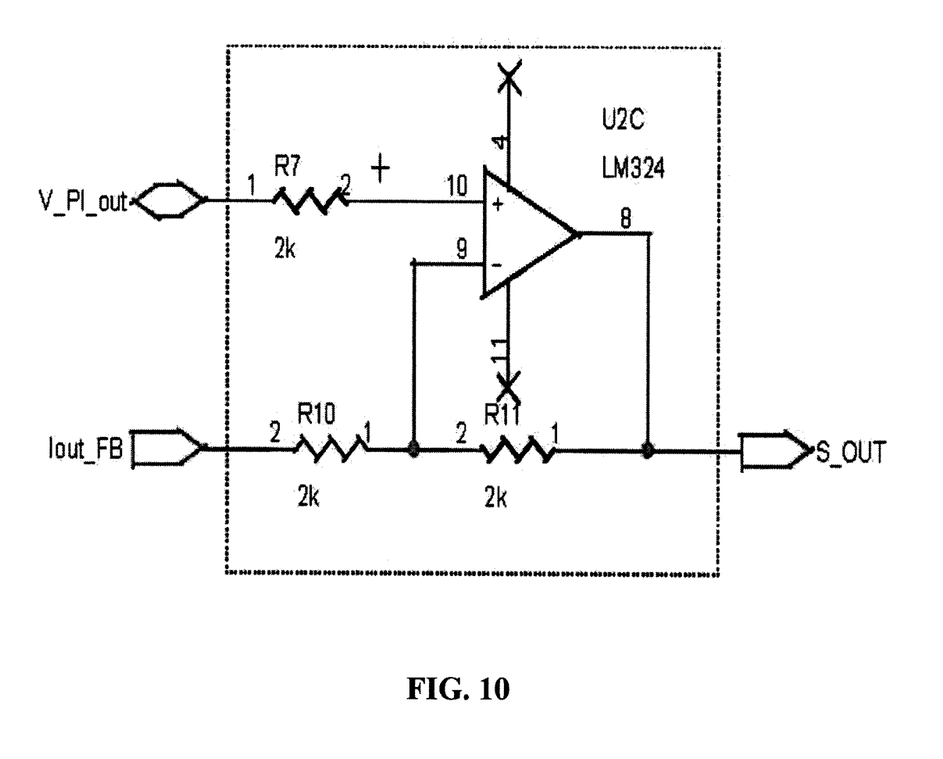
FIG. 10 is a circuit diagram of the current regulating unit of the embodiment of the present invention.

In the present invention, the circuit of the preferred embodiment of the current regulating unit is shown in FIG. 10, wherein P regulation is utilized. This regulation is mainly used for the current sharing, and can also improve the distortion of the output voltage.

5. Power Amplifier Unit

The usage of the power amplifier unit is to convert a direct current power supply to an alternating current power supply, which typically comprises a SPWM generator, a driving circuit, power switching elements and a filter, wherein the SPWM generator compares the given sine voltage signal with high frequency triangular wave to generate SPWM wave with high frequency. The driving circuit uses the SPWM wave to drive the power switching elements, and the power switching elements convert the direct current into an amplified SPWM wave through switching alternatively. The amplified SPWM wave is filtered out the carrier wave by the filter, and then the sine alternating current power supply is obtained.

It can be seen from the technical solution of the present invention and the detailed embodiment that the present invention has the follow advantages in comparison with the technical solutions in the prior art: 1) any amount of the inverters can be theoretically connected in parallel; 2) there is no centralized control unit so that there is no fault bottleneck problem; and 3) the functions of all of the parallel connected modules are the same, that is, parallel connection equally.

The invention claimed is:

1. A parallel inverter system having a plurality of inverters, each of the plurality of said inverters comprising a synchronous unit for generating synchronous signals to ensure synchronization of a voltage given signals in the respective inverters which can be connected in parallel, a voltage given generator for generating a sine voltage with a given frequency, a phase and amplitude, a voltage regulating unit for regulating the inverter output voltage, and a power amplifier unit for converting directly a direct current power supply into an alternating current power supply, characterized in that each voltage regulating unit of each inverter includes a voltage regulator circuit and a voltage linear combination circuit, and the voltage linear combination circuit combines linearly all of the output voltages of the voltage regulator, and then outputs them to the power amplifier unit.

2. The parallel inverter system of claim 1, wherein the synchronous unit is a synchronizing square wave generator, wherein precise high frequency oscillating signals are generated by an oscillator in the synchronizing square wave generator, output to a divider to form a square wave with the power frequency, and then output though an OC gate and fault shield switch (K2), and then output the outputs of respective dividers after AND to the voltage given generator as synchronizing square waves.

3. The parallel inverter system of claim 2, wherein the voltage given generator a voltage virtual value given circuit inputs a required voltage virtual value, which is outputted to a sine wave generator through a virtual value regulating circuit; a phase discriminator receives the synchronizing square wave output by the synchronizing square wave generator, and constitutes a phase-locked loop with the sine wave generator; the output terminal of the sine wave generator connects the voltage regulating unit, and the output impedance circuit can linearly combine the outputs of the various sine wave generators through the impedance circuit and the fault shield switch (K3) to give it as the voltage of the voltage regulating unit.

4. The parallel inverter system of claim 1, wherein the amplifier unit includes a SPWM generator, a driving circuit, a power switch element and a filter connected in turn; the high frequency SPWM waves generated by the SPWM generators are used to drive power switch elements after they are amplified by the driving circuit, the power switch elements are turned on and off alternately to convert the direct current into amplified SPWM wave, and the carrier wave of the amplified SPWM wave is removed by the filter to obtain the amplified sine alternating-current power supply.

5. The parallel inverter system of claim 1, wherein the voltage regulating unit the voltage regulator can be P regulation, PI regulation or PID regulation; and the voltage linear combination circuit comprises an output impedance and a fault shield switch (K4).

6. The parallel inverter system of claim 1, wherein the voltage regulator unit can also include a saturation suppression circuit, the saturation suppression circuit detecting the difference between the output voltage of the voltage regulator and the output linear combination value of the parallel inverter system, and feeding back to it to the voltage regulator.

7. The parallel inverter system of claim 1, wherein a current regulator unit for regulating the distortion of the inverter output voltage and realizing the even distribution of the load of respective inverters is connected between the voltage unit for regulating the power amplifier unit.

8. The parallel inverter system of claim 1, wherein the following relation exists between the output voltage of respective voltage regulator $V\_PI(j)$ and the output voltage of the voltage linear combination circuit after linear combination V_PI_out, $$\text{V\_PI\_out} = \sum_{j=1}^{N} K(j) \cdot \text{V\_PI}(j),$$

wherein K(j) is weight number $$\sum_{j=1}^{N} K(j) = 1.$$

9. The parallel inverter system of claim 1, wherein the following relation exists between the output voltage of respective voltage regulator V_PI(j) and the output voltage of the voltage linear combination circuit after average V_PI_out, $$\text{V\_PI\_out} = \sum_{j=1}^{N} \text{V\_PI}(j) \div N,$$

wherein N is the number of the parallel inverters.

* * * * *